United States Patent
Standish et al.

(10) Patent No.: US 7,918,653 B2
(45) Date of Patent: Apr. 5, 2011

(54) ROTOR BLADE TRAILING EDGE ASSEMBY AND METHOD OF USE

(75) Inventors: Kevin James Standish, Simpsonville, SC (US); Stefan Herr, Greenville, SC (US); Nicholas Keane Althoff, Ware Shoals, SC (US); Jamie Thomas Livingston, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 557 days.

(21) Appl. No.: 11/672,238

(22) Filed: Feb. 7, 2007

(65) Prior Publication Data

US 2008/0187442 A1 Aug. 7, 2008

(51) Int. Cl.
*F01D 5/14* (2006.01)
(52) U.S. Cl. .............. 416/228; 416/232; 416/236 R
(58) Field of Classification Search .......... 416/228, 416/224, 229 R, 230, 232, 235, 236 R; 415/119
See application file for complete search history.

(56) References Cited

U.S. PATENT DOCUMENTS

| | | | |
|---|---|---|---|
| 4,247,258 A | 1/1981 | Griffee, Jr. et al. | |
| 6,491,260 B2 * | 12/2002 | Borchers et al. | 244/199.1 |
| 6,830,436 B2 * | 12/2004 | Shibata et al. | 416/228 |
| 7,059,833 B2 | 6/2006 | Stiesdal et al. | |
| 7,182,575 B2 | 2/2007 | Grabau | |
| 2005/0180853 A1 | 8/2005 | Grabau et al. | |
| 2006/0018759 A1 | 1/2006 | Moser | |
| 2007/0041829 A1 | 2/2007 | Bonnet | |
| 2007/0077150 A1 * | 4/2007 | Llorente Gonzalez | 416/223 R |
| 2008/0080977 A1 * | 4/2008 | Bonnet | 416/229 A |
| 2008/0166241 A1 * | 7/2008 | Herr et al. | 416/241 R |

FOREIGN PATENT DOCUMENTS

DE 10340978 A1 * 4/2005

\* cited by examiner

*Primary Examiner* — Edward Look
*Assistant Examiner* — Jesse Prager
(74) *Attorney, Agent, or Firm* — James McGinness, Esq.; Armstrong Teasdale LLP

(57) ABSTRACT

A method of assembling a rotor blade for a turbine is provided that includes forming a rotor blade trailing edge by coupling a suction side terminus to a pressure side terminus and positioning a trailing edge assembly between the suction side terminus and the pressure side terminus, the trailing edge assembly having a varying cross-section.

17 Claims, 7 Drawing Sheets

ROTOR BLADE TRAILING EDGE ASSEMBY AND METHOD OF USE

BACKGROUND OF THE INVENTION

This invention relates generally to rotary blades, and more particularly, to a rotor blade trailing edge assembly and method of use.

Generally, a wind turbine generator includes a rotor having multiple blades. The rotor is sometimes mounted within a housing, or nacelle, that is positioned on top of a base, for example a truss or tubular tower. At least some known utility grade wind turbines (i.e., wind turbines designed to provide electrical power to a utility grid) can have rotor blades of 30 meters (m) (100 feet (ft)) or more in length.

Known rotor blades are generally difficult and time consuming to manufacture. They are generally manufactured from two molded fiberglass shells fitted together to define a blade cross section having a leading edge and a trailing edge. However, due to the poor structural characteristics of fiberglass, when the shells are fitted together the trailing edge usually requires additional finishing for defining a finished trailing edge width. Using contemporary techniques, known fiberglass trailing edges generally cannot be finished to less than two-and-a-half millimeters. The trailing edge is generally the weakest region of a rotor blade and its width may also contribute to noise generated by the rotor blades during wind turbine operation.

Because of their size and/or fragility, some known large rotor blades may be damaged during transportation. For example, the trailing edge of some known rotor blades may be damaged during loading and/or unloading into and/or unloading from at least some known transportation containers, or during installation. Additionally, because rotor blades are much longer than wide, rotor blades are susceptible to buckling during operation as well as during transportation and installation.

BRIEF DESCRIPTION OF THE INVENTION

In one aspect, a method of assembling a rotor blade for a turbine is provided. The method includes forming a rotor blade trailing edge by coupling a suction side terminus to a pressure side terminus and positioning a trailing edge assembly between the suction side terminus and the pressure side terminus, the trailing edge assembly having a varying cross-section.

In another aspect, a rotor blade assembly is provided. The rotor blade assembly includes a rotor blade including a trailing edge portion and a trailing edge assembly coupled to the trailing edge portion, the trailing edge assembly having a varying cross-section and including a trailing edge.

In yet another aspect, a trailing edge insert for a rotor blade is provided. The trailing edge assembly includes a body including an upper side, a lower side and at least one leg, the upper side and the lower side are configured to define a rotor blade trailing edge, the body is configured to attach to the rotor blade, and the trailing edge assembly has a varying cross-section.

DETAILED DESCRIPTION OF THE INVENTION

Figure 1:
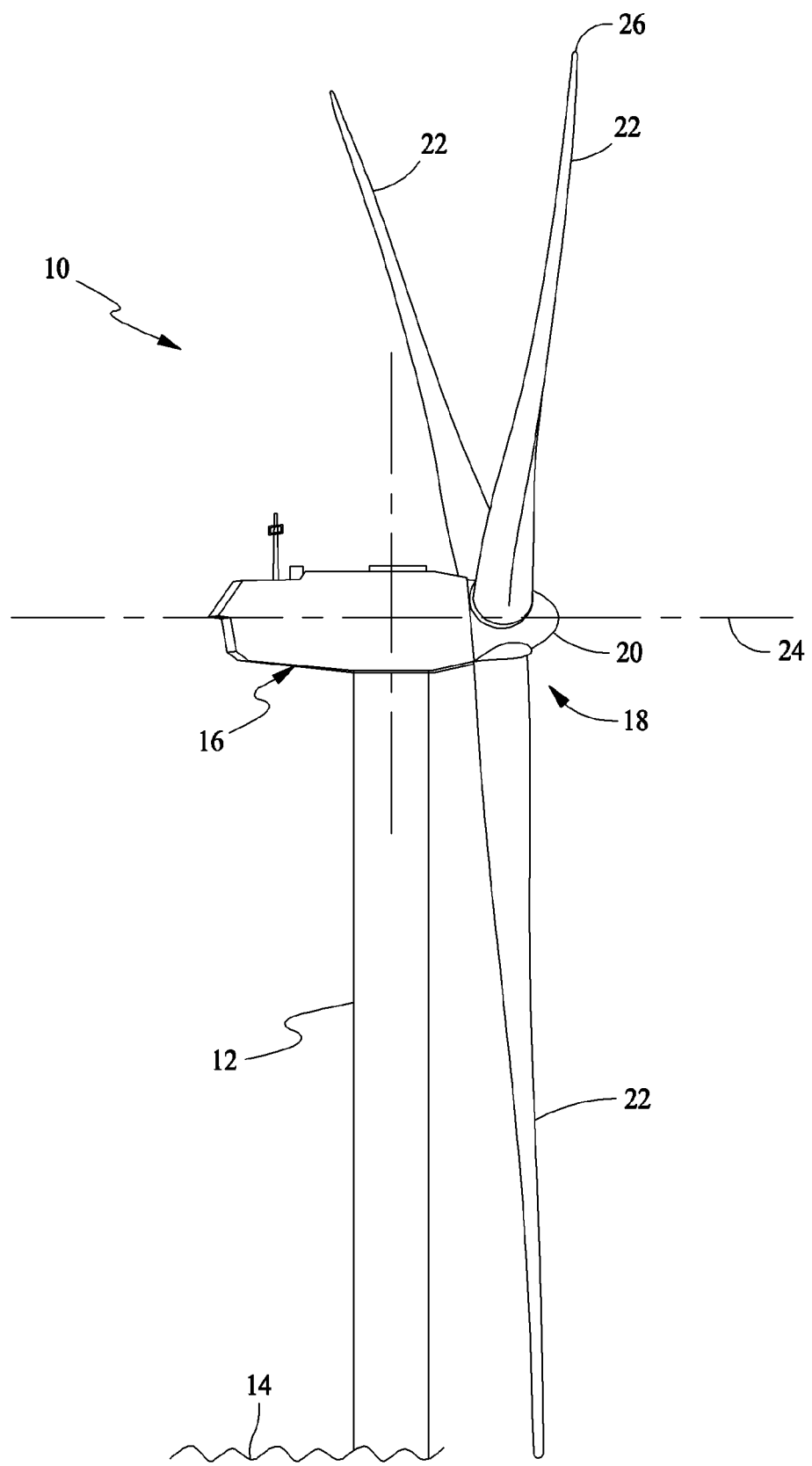
FIG. 1 is a schematic illustration of an exemplary wind turbine generator.

FIG. 1 is a schematic illustration of an exemplary wind turbine generator 10. In the exemplary embodiment, wind turbine generator 10 is a horizontal axis wind turbine. Alternatively, wind turbine 10 may be a vertical axis wind turbine. Wind turbine 10 has a tower 12 extending from a supporting surface 14, a nacelle 16 mounted on tower 12, and a rotor 18 coupled to nacelle 16. Rotor 18 has a rotatable hub 20 and a plurality of rotor blades 22 coupled to hub 20. In the exemplary embodiment, rotor 18 has three rotor blades 22. In an alternative embodiment, rotor 18 may have more or less than three rotor blades 22. A center line 24 extends through nacelle 16 and hub 20. Each rotor blade 22 includes a tip 26. In the exemplary embodiment, tower 12 is fabricated from tubular steel and has a cavity (not shown in FIG. 1) extending between supporting surface 14 and nacelle 16. In an alternate embodiment, tower 12 is a lattice tower. The height of tower 12 is selected based upon factors and conditions known in the art. Blades 22 are positioned about rotor hub 20 to facilitate rotating rotor 18 to transfer kinetic energy from the wind into usable mechanical energy, and subsequently, electrical energy.

Figure 2:
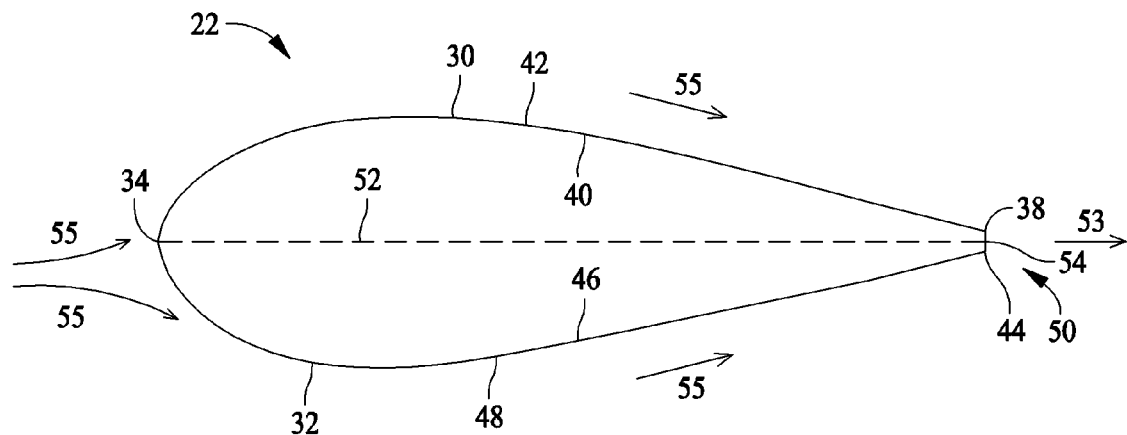
FIG. 2 is a cross-sectional view of a rotor blade that may be used with the wind turbine generator shown in FIG. 1.

FIG. 2 is a cross-sectional view of rotor blade 22 which may be used with the wind turbine generator shown in FIG. 1. More specifically, each blade 22 includes a suction sidewall 30 defining a suction side of blade 22, and a pressure sidewall 32 defining a pressure side of blade 22. Sidewalls 30 and 32 are joined at a leading edge 34 and at known trailing edge 50. Suction side 30 has a varying contour, extends from leading edge 34 to a suction side terminus 38, has an interior surface 40 and has an exterior surface 42. Pressure side 32 has a varying contour, extends from leading edge 34 to a pressure side terminus 44, has an interior surface 46 and has an exterior surface 48. Suction side 30 and pressure side 32 each represent a molded fiberglass half of blade 22. Suction side 30 and pressure side 32 are assembled to form rotor blade 22. Rotor blade 22 defines a chord 52 as the distance between leading edge 34 and a midpoint 54 of known trailing edge 50. Fluid 55 flow around blade 22 is shown using arrows. It should be appreciated that "fluid" as used herein includes any material or medium that flows, including, but not limited to, gas, air and liquids.

Figure 3:
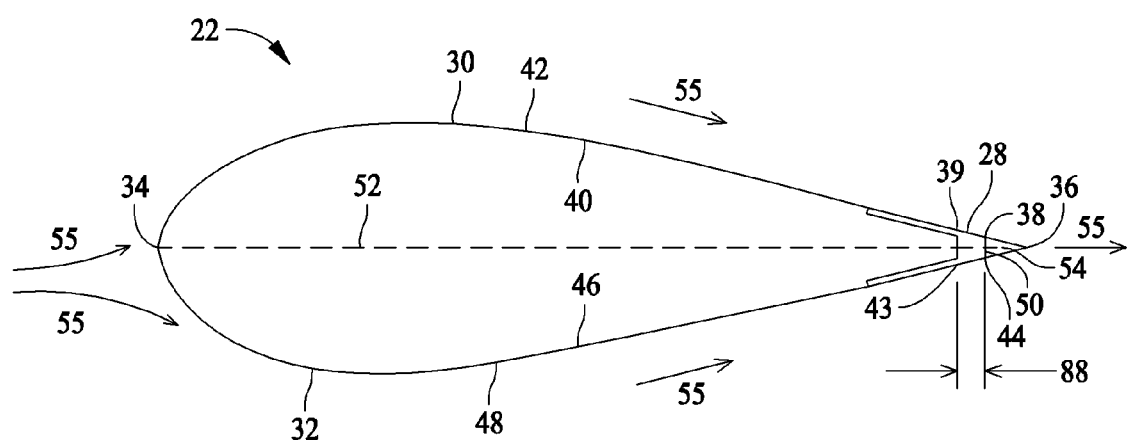
FIG. 3 is a cross-sectional view of a rotor blade, including an exemplary trailing edge assembly, that may be used with the wind turbine generator shown in FIG. 1.

The information shown in FIG. 3 is the same information shown in FIG. 2, as described in more detail below. As such, components illustrated in FIG. 3 that are identical to components to illustrated in FIG. 2, are identified using the same reference numerals used in FIG. 2.

FIG. 3 is a cross-sectional view of rotor blade 22, including an exemplary trailing edge assembly 28, which may be used with the wind turbine generator shown in FIG. 1. It should be appreciated that the length of chord 52, as shown in FIG. 3, is identical to the length of chord 52 as shown in FIG. 2. It should be understood that sound is generated by variations, or fluctuations, in pressure. Known rotor blade trailing edges can be manufactured to a minimum two-and-a-half millimeter width. These known trailing edges of rotor blades experience pressure fluctuations during operation, due to the generally chaotic nature of fluid 55 flow at the trailing edges, and generate related undesirable noise. To reduce noise produced by rotor blades, known trailing edges may be configured to inhibit pressure fluctuations. By forcing fluid 55 to follow sides 30 and 32 from leading edge 34 to a sharp or pointed trailing edge 36, fluid 55 flowing along side 30 and fluid 55 flowing along side 32 come together in a steady uniform manner at trailing edge 36. Thus, pressure fluctuations at trailing edge 36 are reduced.

Figure 4:
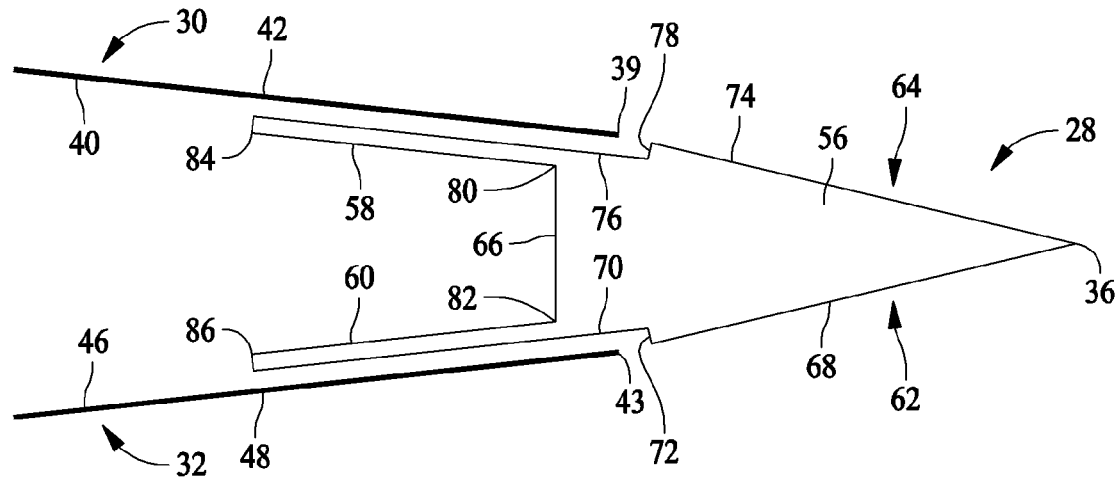
FIG. 4 is an enlarged cross-sectional view of a portion of the rotor blade shown in FIG. 3, including the exemplary trailing edge assembly.

FIG. 4 is an enlarged cross-sectional view of a portion of rotor blade 22 shown in FIG. 3, including an exemplary trailing edge assembly 28. Trailing edge assembly 28 includes a body portion 56 and legs 58 and 60 extending therefrom. Body portion 56 includes sides 62 and 64, and a bottom surface 66. More specifically, side 62 includes an exterior surface portion 68 and an interior surface portion 70 with a step 72 disposed therebetween. Exterior surface portion 68 is shaped to extend the contour of exterior surface 48 of pressure side 32 and may become linear towards trailing edge 36. Interior surface portion 70 is shaped to fit against interior surface 46 of pressure side 32 and step 72 matches the thickness of pressure side 32. Likewise, side 64 includes an exterior surface portion 74 and an interior surface portion 76 with a step 78 disposed therebetween. Exterior surface portion 74 is shaped to extend the contour of exterior surface 42 of suction side 30 and may become linear towards trailing edge 36. Interior surface portion 76 is shaped to fit against interior surface 40 of suction side 30 and step 78 matches the thickness of suction side 30. Exterior surface portions 68 and 74 both taper and converge at an edge, or point, defining trailing edge 36. Bottom surface 66 has a first end 80 and a second end 82. Leg 58 extends from first end 80 to an end 84 and is shaped to match interior surface 40 of suction side 30 proximate a terminus 39 of suction side 30. Leg 60 extends from second end 82 to an end 86 and is shaped to match interior surface 46 of pressure side 32 proximate a terminus 43 of pressure side 32. It should be appreciated that legs 58 and 60 may have any length that facilitates coupling trailing edge assembly 28 to blade 22 and that enables trailing edge assembly 28 to function as described herein. Further, it should be appreciated that exterior surface portions 68 and 74 may be beveled to converge at an edge, or point, to define point 36.

It should be appreciated that the cross-section of rotor blade 22 varies from rotor hub 20 to tip 26. Moreover, it should be appreciated that the cross-section of trailing edge assembly 28, defined by surface portions 68 and 74, also varies along the length of rotor blade 22 from rotor hub 20 to tip 26 for extending the contour of surfaces 48 and 42, respectively. Consequently, trailing edge assembly 28 does not have a constant cross-section along the length of rotor blade 22.

In the exemplary embodiment, trailing edge assembly 28 is manufactured separate and apart from rotor blade 22. During fabrication of blade 22, trailing edge assembly 28 is positioned between sides 30 and 32. More specifically, leg 58 and interior surface portion 76 are positioned to extend parallel to and adjacent interior surface 40. In addition, step 78 is positioned against terminus 39, such that exterior surface portion 74 is substantially flush with exterior surface 42 and provides a smooth continuation of exterior surface 42. Likewise, leg 60 and interior surface portion 70 are positioned to extend parallel to and adjacent interior surface 40. In addition, step 72 is positioned against terminus 43, such that exterior surface portion 68 is substantially flush with exterior surface 48 and provides a smooth continuation of exterior surface 48. Legs 58 and 60, and associated steps 78 and 72, are coupled to respective sides 30 and 32 using an adhesive. It should be appreciated that although the exemplary embodiment describes legs 58 and 60 as positioned within blade 22 against interior surface 40 and interior surface 46, respectively, in other embodiments, trailing edge assembly 28 may be positioned such that legs 58 and 60 are positioned against exterior surface 42 and exterior surface 48, respectively, that enables trailing edge assembly 28 to function as described herein. In such embodiments, interior surface portion 70 is flush with exterior surface 48 and interior surface portion 76 is flush with exterior surface 42. In the exemplary embodiment, the adhesive is bonding paste. It should be appreciated that although the exemplary embodiment uses bonding paste as the adhesive, other embodiments may use any other adhesive or fastening means, such as, but not limited to, mechanical fasteners, that facilitates coupling trailing edge assembly 28 to blade 22 and enables assembly 28 to function as described herein.

Figure 5:
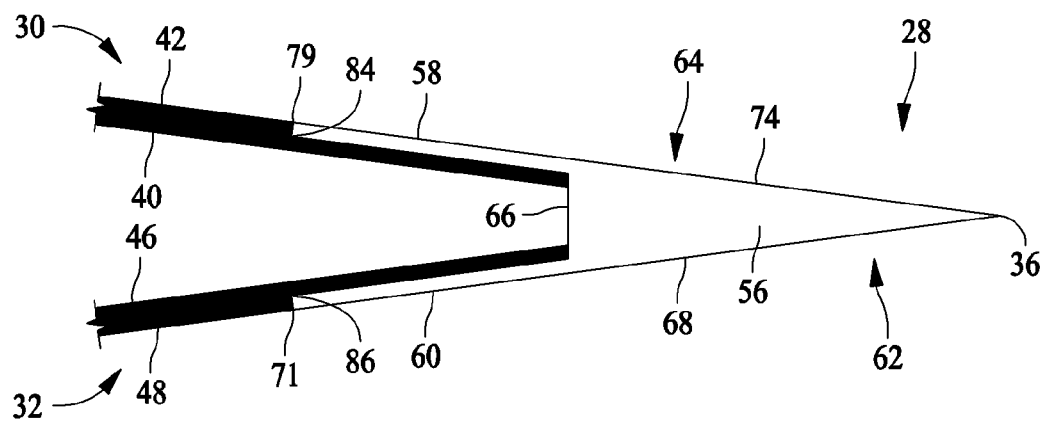
FIG. 5 is an enlarged cross-sectional view of a portion of the rotor blade shown in FIG. 3, including an alternative exemplary trailing edge assembly.

The information shown in FIG. 5 is the same information shown in FIG. 4, as described in more detail below. As such, components illustrated in FIG. 5 that are identical to components to illustrated in FIG. 4, are identified using the same reference numerals used in FIG. 4.

FIG. 5 is an enlarged cross-sectional view of a portion of rotor blade 22 shown in FIG. 3, including an alternative exemplary trailing edge assembly 28. This alternative embodiment is similar to that shown in FIG. 4. However, trailing edge assembly 28 does not include steps 72 and 78, and legs 58 and 60 are positioned against exterior surface 42 of suction side 30 and exterior surface 48 of pressure side 32, respectively. More specifically, suction side 30 and pressure side 32 include steps 79 and 71, respectively. Ends 84 and 86 are positioned flush against steps 79 and 71, respectively, such that exterior surface portions 74 and 68 are shaped to extend the contours of exterior surfaces 42 and 48, respectively. It should be appreciated that legs 58 and 60 may have any length that facilitates coupling trailing edge assembly 28 to blade 22 and that enables trailing edge assembly 28 to function as described herein.

Because trailing edge assembly 28 is designed to terminate at a sharp trailing edge 36, trailing edge finishing is not required. As a result, labor costs are reduced. Moreover, because trailing edge assembly 28 is integrated into blade 22 in the exemplary embodiment, a trailing edge portion 88 (shown in FIG. 3) of sides 30 and 32 does not require manufacturing. Because the widths of sides 30 and 32 are reduced, transportation restraints dependant upon the width of sides 30 and 32 are alleviated. Thus, in the exemplary embodiment, blade 22 may be transported to a project location and trailing edge assembly 28 integrated into blade 22 at the project location. It should be appreciated that in the exemplary embodiment trailing edge portion 88 reduces the width of sides 30 and 32 by about ten percent. Although the exemplary embodiment describes trailing edge portion 88 as reducing the width of sides 30 and 32 by about ten percent, in other embodiments, trailing edge portion 88 may be sized to reduce the width of sides 30 and 32 by any percentage that enables trailing edge assembly 28 to function as described herein.

In the exemplary embodiment, trailing edge assembly 28 is fabricated from an electrically conductive material that is flexible, and is capable of imparting strength and rigidity to blade 22. In addition, the material is capable of being formed to a point, and is not brittle. Such materials include, but are not limited to, copper, aluminum, steel, tin and titanium. It should be appreciated that other various exemplary embodiments may use any other material that enables trailing edge assembly 28 to function as described herein.

Body 56 of trailing edge assembly 28 is substantially solid in the exemplary embodiment. However, it should be appreciated that although body 56 is solid in the exemplary embodiment, other embodiments may use a hollow or partially hollow body 56 that enables assembly 28 to function as described herein.

In the exemplary embodiment, integrating trailing edge assembly 28 into rotor blade 22 facilitates reducing manufacturing time, costs and delays. Furthermore, trailing edge assembly 28 imparts substantial structural integrity to blade 22. Due to its structural strength and rigidity, trailing edge assembly 28 facilitates preventing buckling of blade 22 and facilitates decreasing the susceptibility of trailing edge 36 to damage during transportation and installation. Moreover, because trailing edge assembly 28 is fabricated from electrically conductive materials in the exemplary embodiment, assembly 28 may also function as lightening protection for blade 22 and wind turbine 10.

Known wind turbine rotor blades 22 include a small number of discrete locations designed to attract lightening strikes. Generally, a three or four inch disc is disposed at tip 26 of blade 22. A grounding circuit (not shown) extends from tip 26 of blade 22 to nacelle 12 and down through tower 18 where it is grounded. In the exemplary embodiment, trailing edge assembly 28 extends along the full length of blade 22 and is electrically conductive, thus it provides a continuous lightening protection edge that decreases the risk of lightening strikes from occurring on blade 22. Because trailing edge assembly 28 extends for the full length of blade 22, the grounding circuit is not required to extend through blade 22, thus reducing costs. It should be appreciated that although the exemplary embodiment includes trailing edge assembly 28 extending along the full length of blade 22, in other embodiments, trailing edge assembly 28 does not extend along the full length of blade 22, instead assembly 28 extends along only a portion of blade 22.

Other various exemplary embodiments not requiring features such as increased lightening protection or substantial rigidity may use materials other than those described above. For example, trailing edge assembly 28 may be manufactured from plastic materials for embodiments not requiring increased lightening protection. Alternatively, assembly 28 may be manufactured from rubber materials for embodiments requiring a more flexible, versus rigid, blade 22.

Figure 6:
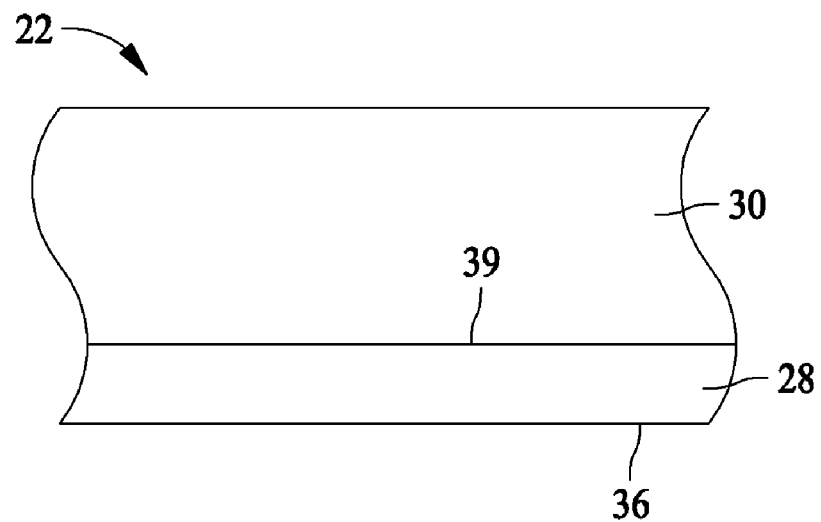
FIG. 6 is a top view of the rotor blade including the exemplary trailing edge assembly.

FIG. 6 is a top view of rotor blade 22 including exemplary trailing edge assembly 28. In the exemplary embodiment, trailing edge assembly 28 extends along termini 39 and 43 of sides 30 and 32, respectively, such that trailing edge 36 is a continuous straight line profile offset and parallel to termini 39 and 43. It should be appreciated that although the exemplary embodiment includes a continuous trailing edge 36 defining a straight line profile offset and parallel to termini 39 and 43, other embodiments may use any profile that enables trailing edge assembly 28 to function as described herein.

Figure 7:
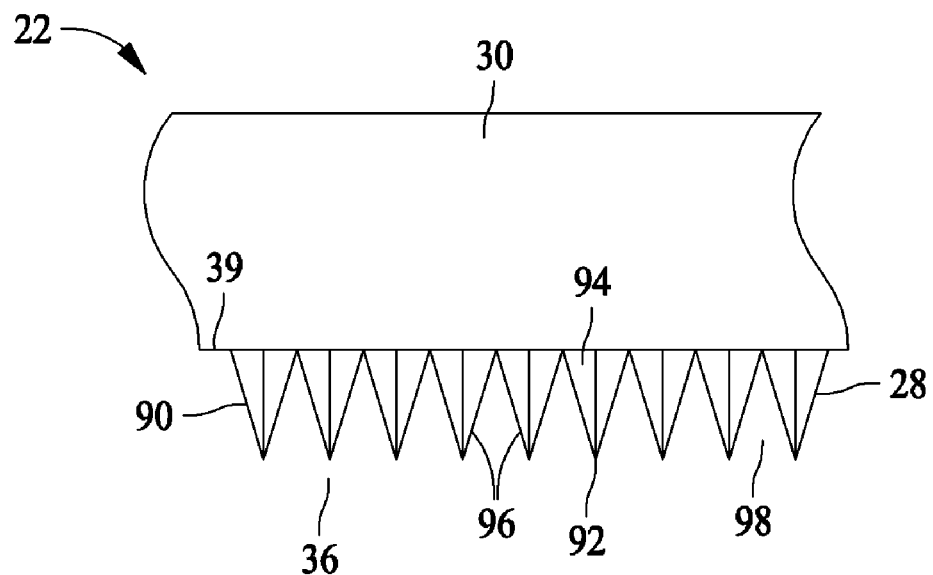
FIG. 7 is a top view of the rotor blade including an alternative exemplary trailing edge assembly.

FIG. 7 is a top view of rotor blade 22 including an alternative exemplary trailing edge assembly 28. In this alternative embodiment, trailing edge assembly 28 is configured to define a plurality of adjacent triangularly shaped teeth 90. Each tooth 90 includes a point 92, a base 94 extending along a line defined by terminus 39 of suction side 30, and sides 96. Teeth 90 abut each other at their respective bases 94, and are separated by a gap 98 at their respective points 92, such that trailing edge 36 has a saw tooth profile. The saw tooth profile configuration of trailing edge 36 facilitates mitigating noise produced at trailing edge 36.

Figure 8:
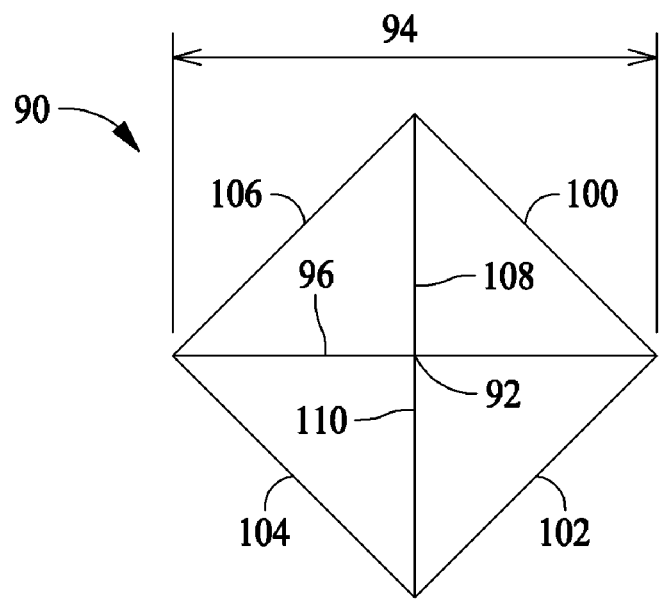
FIG. 8 is a partial front view of the alternative exemplary trailing edge assembly shown in FIG. 7.

FIG. 8 is a partial front view of the alternate exemplary trailing edge assembly 28 shown in FIG. 7. More specifically, in this alternative embodiment, base 94 of teeth 90 includes four base sides 100, 102, 104 and 106 forming a square base 94. An upper edge 108 extends from the intersection of sides 100 and 106 to point 92, and a lower edge 110 extends from the intersection of sides 102 and 104 to point 92. Likewise, sides 96 extend from the intersection of sides 104 and 106, and sides 100 and 102, to point 92. It should be appreciated that sides 100, 102, 104 and 106 may each be any length, not necessarily equal that enables trailing edge assembly 28 to function as described herein. Further, it should be appreciated that although base 94 is described as having a square configuration in the exemplary embodiment, other various exemplary embodiments may use any configuration for base 94 that enables trailing edge assembly 28 to function as described herein.

Figure 9:
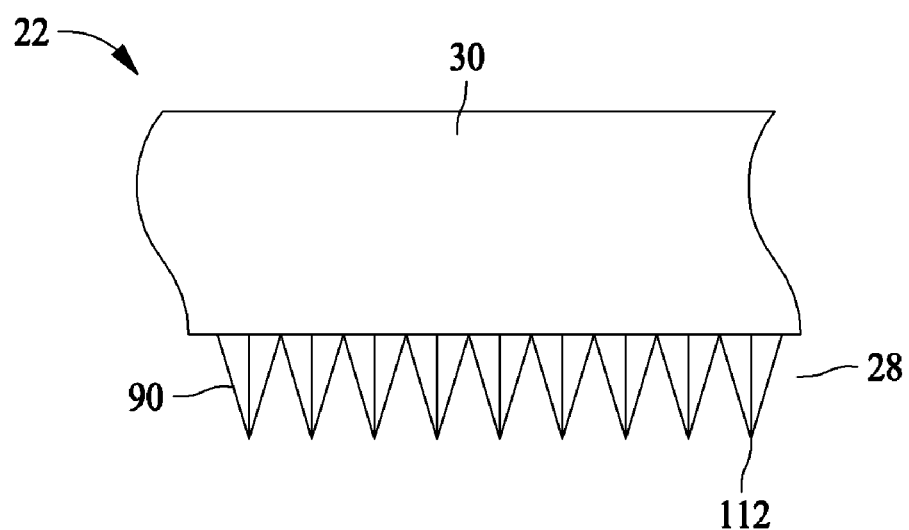
FIG. 9 is a top view of the rotor blade including yet another alternative exemplary trailing edge assembly.

FIG. 9 is a top view of rotor blade 22 including yet another alternative exemplary trailing edge assembly 28. This alternative embodiment is similar to that shown in FIGS. 7 and 8. However, trailing edge assembly 28 includes a plurality of teeth 90 each having bristles 112 extending therefrom.

Figure 10:
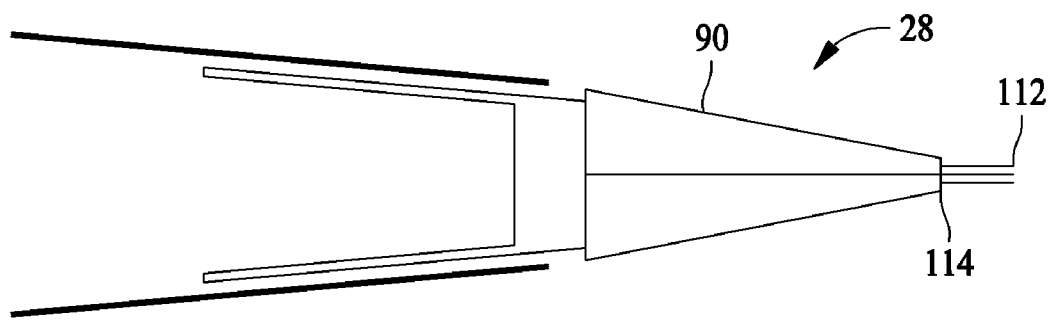
FIG. 10 is an enlarged cross-sectional view of the alternative exemplary trailing edge assembly shown in FIG. 9.

FIG. 10 is an enlarged cross-sectional view of the alternative exemplary trailing edge assembly 28 shown in FIG. 9. More specifically, in this alternative embodiment, each tooth 90 terminates with a truncated trailing edge 114 and bristles 112 extend from truncated trailing edge 114. Teeth 90, coupled with bristles 112, facilitate mitigating noise produced at truncated trailing edge 114. In this exemplary embodiment and in the embodiments that follow, bristles 112 may be fabricated from plastic or nylon materials. It should be appreciated that other embodiments may include bristles 112 fabricated from any other material that enables truncated trailing edge 114 to function as described herein. Further, it should be appreciated that bristles 112 may be any length that enables trailing edge assembly 28 to function as described herein.

Figure 11:
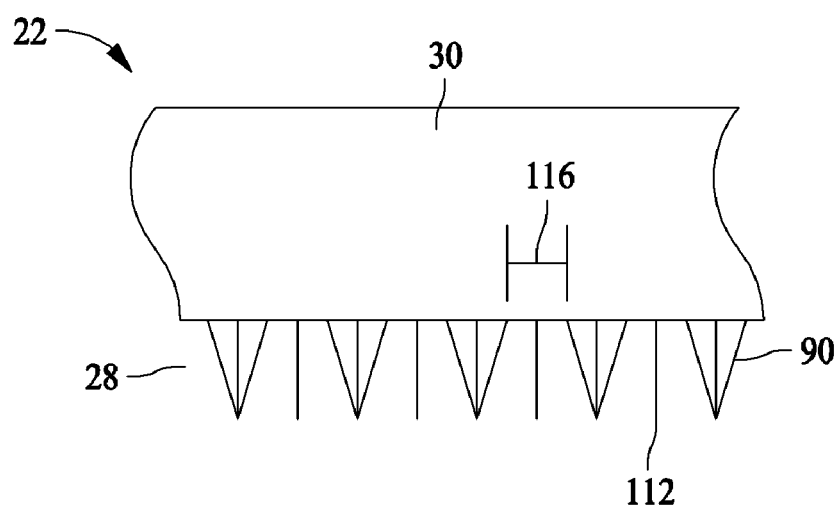
FIG. 11 is a top view of the rotor blade including yet another alternative exemplary trailing edge assembly.

FIG. 11 is a top view of rotor blade 22 including yet another alternative exemplary trailing edge assembly 28. In this alternative embodiment, trailing edge assembly 28 includes a plurality of teeth 90 and a gap 116 is defined between bases 94 of each tooth 90. A bristle 112 is disposed in each gap 116 between teeth 90.

Figure 12:
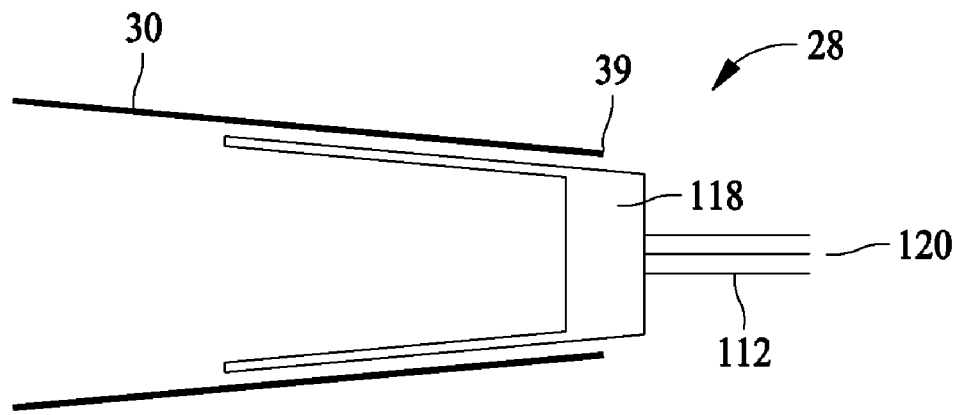
FIG. 12 is an enlarged cross-sectional view of the alternative exemplary trailing edge assembly shown in FIG. 11.

FIG. 12 is an enlarged cross-sectional view of the alternative exemplary trailing edge assembly 28 shown in FIG. 11. In this alternative embodiment, bristles 112 are disposed in and extend away from a lower body portion 118 of trailing edge assembly 28. In this alternative embodiment, bristles 112 and teeth 90 extend between about one to two centimeters from terminus 38 of suction side 30. Teeth 90 in this alternative embodiment are substantially identical to teeth 90 shown in FIGS. 7 and 8. Alternating teeth 90 with bristles 112 facilitates mitigating noise produced at alternating trailing edge 120. It should be appreciated that gaps 116 may be any width that enables trailing edge assembly 28 to function as described herein.

Figure 13:
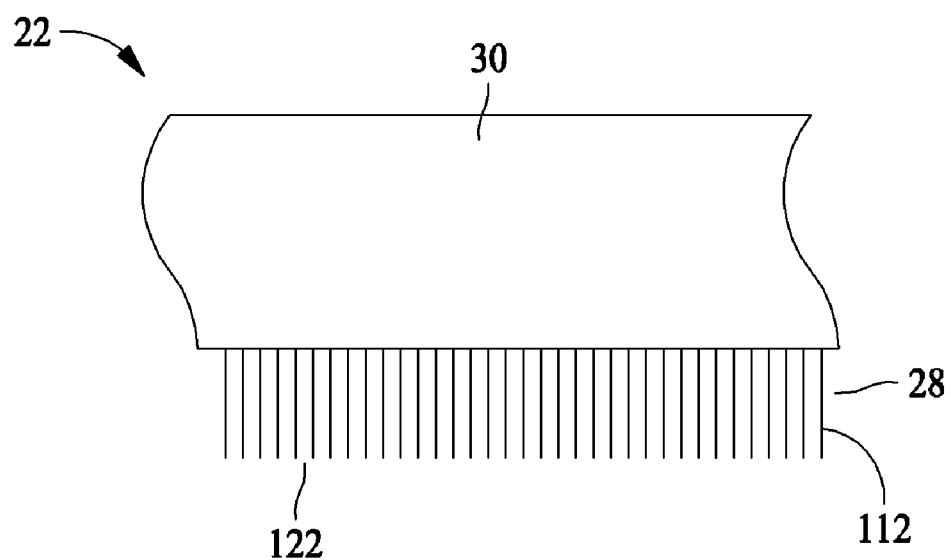
FIG. 13 is a top view of the rotor blade including yet another alternative exemplary trailing edge assembly.

FIG. 13 is a top view of rotor blade 22 including yet another alternate exemplary trailing edge assembly 28. In this alternate embodiment, a plurality of bristles 112 is disposed along the length of trailing edge assembly 28 to define a discrete trailing edge 122. It should be appreciated that bristles 112 are disposed in and extend away from lower body portion 118 as illustrated in FIG. 12. Disposing bristles 112 along the length of trailing edge assembly 28 facilitates mitigating noise produced at discrete trailing edge 122. It should be appreciated that other embodiments may dispose bristles 112 along the length of assembly 28 at any spacing that enables assembly 28 to function as described herein.

In each embodiment the above-described trailing edge assemblies facilitate reducing noise produced by rotor blades and facilitate increasing the structural integrity of rotor blades. More specifically, in each embodiment, the assembly facilitates inhibiting pressure fluctuations at the trailing edge by forcing fluid to follow the sides of the blade and join at respective trailing edges. Moreover, because the trailing edge assembly extends along the length of the blade, it imparts structural integrity to the blade and provides continuous lightening protection. As a result, turbine operation facilitates minimizing noise generation and damage to the blade. Accordingly, turbine performance and component useful life are each enhanced in a cost effective and reliable manner.

Exemplary embodiments of trailing edge assemblies are described above in detail. The assemblies are not limited to use with the specific turbine embodiments described herein, but rather, the assemblies can be utilized independently and separately from other assembly components described herein. Moreover, the invention is not limited to the embodiments of the assemblies described above in detail. Rather, other variations of assembly embodiments may be utilized within the spirit and scope of the claims.

While the invention has been described in terms of various specific embodiments, those skilled in the art will recognize that the invention can be practiced with modification within the spirit and scope of the claims.

What is claimed is:

1. A method of assembling a rotor blade for a turbine, said method comprising:
    forming a rotor blade trailing edge by coupling a trailing edge assembly to a suction sidewall and a pressure sidewall in a hollow portion of the rotor blade;
    coupling the trailing edge assembly to the suction sidewall and the pressure sidewall using at least one of an adhesive and a mechanical fastener; and
    positioning the trailing edge assembly with respect to a suction side terminus and a pressure side terminus, such that a first leg of the trailing edge assembly contacts an interior surface of the suction sidewall of the rotor blade and a second leg of the trailing edge assembly contacts an interior surface of the pressure sidewall of the rotor blade, or such that the first leg of the trailing edge assembly contacts an exterior surface of the suction sidewall of the rotor blade and the second leg of the trailing edge assembly contacts an exterior surface of the pressure sidewall of the rotor blade, the trailing edge assembly having a varying cross-section.

2. A method in accordance with claim 1 further comprising coupling the first leg to the suction sidewall and the second leg to the pressure sidewall, wherein an opposing end of the trailing edge assembly extends away from suction sidewall and pressure sidewall trailing edges to define a rotor blade trailing edge.

3. A method in accordance with claim 2 further comprising beveling the rotor blade trailing edge.

4. A method in accordance with claim 2 further comprising disposing bristles on the rotor blade trailing edge.

5. A method in accordance with claim 2 further comprising forming a plurality of teeth in the opposing end.

6. A method in accordance with claim 1 further comprising extending the trailing edge assembly along a portion of a length of the rotor blade.

7. A method in accordance with claim 1 wherein the trailing edge assembly comprises a conducting metal.

8. A rotor blade assembly comprising:
    a rotor blade including a suction sidewall and a pressure sidewall forming a trailing edge portion in a hollow portion of the rotor blade; and
    a trailing edge assembly coupled to said trailing edge portion, said trailing edge assembly comprising a first leg contacting an interior surface of the suction sidewall and a second leg contacting an interior surface of the pressure sidewall, or comprising a first leg contacting an exterior surface of the suction sidewall and a second leg contacting an exterior surface of the pressure sidewall, the trailing edge assembly having a varying cross-section and comprising a trailing edge, said trailing edge assembly further comprising a plurality of teeth, each said tooth separated from an adjacent said tooth by a gap.

9. A rotor blade assembly in accordance with claim 8 wherein said trailing edge assembly further comprises one of a sharp edge, a truncated edge, and a discrete edge.

10. A rotor blade assembly in accordance with claim 8 wherein at least one bristle is disposed in the gap.

11. A rotor blade assembly in accordance with claim 8 wherein said trailing edge assembly further comprises a plurality of bristles.

12. A rotor blade assembly in accordance with claim 8 wherein said suction sidewall has a varying exterior contour, and said pressure sidewall has a varying exterior contour.

13. A rotor blade assembly in accordance with claim 12 wherein said trailing edge assembly further comprises a top side surface and a bottom side surface, wherein said top side surface is flush with said suction sidewall varying exterior contour and is configured to extend said suction sidewall varying exterior contour, and wherein said bottom side surface is flush with said pressure sidewall varying exterior contour and is configured to extend said pressure sidewall varying exterior contour.

14. A trailing edge assembly for a rotor blade, said trailing edge assembly comprising a body configured to couple to a hollow portion of said rotor blade, said body fabricated from an electrically conductive material, said body including a first leg configured to contact an interior surface of a suction sidewall of said rotor blade and a second leg configured to contact an interior surface of a pressure sidewall of said rotor blade, or said body including a first leg configured to contact an exterior surface of the suction sidewall of said rotor blade and a second leg configured to contact an exterior surface of the pressure sidewall of said rotor blade, said trailing edge assembly having a varying cross-section.

15. A trailing edge assembly in accordance with claim 14 wherein said rotor blade trailing edge is one of a continuous profile, a saw tooth profile and a discrete profile.

16. A trailing edge assembly in accordance with claim 14 wherein said rotor blade trailing edge is one of a sharp edge and a truncated edge.

17. A trailing edge assembly in accordance with claim 14 wherein a plurality of bristles is disposed on said rotor blade trailing edge.

* * * * *

UNITED STATES PATENT AND TRADEMARK OFFICE
CERTIFICATE OF CORRECTION

| | | |
|---|---|---|
| PATENT NO. | : 7,918,653 B2 | Page 1 of 1 |
| APPLICATION NO. | : 11/672238 | |
| DATED | : April 5, 2011 | |
| INVENTOR(S) | : Kevin James Standish et al. | |

It is certified that error appears in the above-identified patent and that said Letters Patent is hereby corrected as shown below:

In the title Item (54), delete "ASSEMBY" and insert therefor -- ASSEMBLY --.

Signed and Sealed this
Thirty-first Day of May, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,918,653 B2 | Page 1 of 1 |
| APPLICATION NO. | : 11/672238 | |
| DATED | : April 5, 2011 | |
| INVENTOR(S) | : Kevin James Standish et al. | |

It is certified that error appears in the above-identified patent and that said Letters Patent is hereby corrected as shown below:

Title Page, Item (54) and at Column 1, line 1, in the title delete "ASSEMBY" and insert therefor
-- ASSEMBLY --.

This certificate supersedes the Certificate of Correction issued May 31, 2011.

Signed and Sealed this
Twenty-eighth Day of June, 2011

David J. Kappos
*Director of the United States Patent and Trademark Office*